United States Patent [19]

Iwase et al.

[11] Patent Number: 4,883,376

[45] Date of Patent: Nov. 28, 1989

[54] DATA PROCESSING APPARATUS WITH CRT AND PRINTER

[75] Inventors: Takayuki Iwase, Chiryu; Minoru Sakanobe, Komaki; Yuji Koga, Nagoya, all of Japan

[73] Assignee: Brother Kogyo Kabushiki Kaisha, Aichi, Japan

[21] Appl. No.: 139,634

[22] Filed: Dec. 30, 1987

[30] Foreign Application Priority Data

Jan. 6, 1987 [JP] Japan .................................... 62-808
Jan. 7, 1987 [JP] Japan .................................... 62-1453

[51] Int. Cl.$^4$ ................................................ B41J 3/46
[52] U.S. Cl. .................................... 400/83; 400/691; 400/693; 248/917; 340/711; 364/708
[58] Field of Search ............... 400/83, 691, 692, 693, 400/694; 248/1; 312/7.2, 208; 313/364, 391, 476; 269/908; 340/700, 720, 711; 358/254; D14/100, 106, 107, 111, 113; D18/1; 364/708

[56] References Cited

U.S. PATENT DOCUMENTS

| 3,573,366 | 4/1971 | Joseph | 358/254 |
| 4,049,109 | 9/1977 | Plaza et al. | 400/144.2 |
| 4,306,253 | 12/1981 | Nakamura | 358/254 |
| 4,427,243 | 1/1984 | Miller | 358/254 |
| 4,458,961 | 7/1984 | Browning | 312/208 |
| 4,510,345 | 4/1985 | Costa et al. | 400/693 |
| 4,668,026 | 5/1987 | Lapeyre et al. | 312/7.2 |
| 4,716,493 | 12/1987 | Zelkowitz | 358/254 |
| 4,726,633 | 2/1988 | Noble et al. | 312/7.2 |
| 4,742,485 | 5/1988 | Carlson et al. | 400/83 |

FOREIGN PATENT DOCUMENTS

| 2828639 | 10/1979 | Fed. Rep. of Germany | 400/694 |
| 3046037 | 7/1982 | Fed. Rep. of Germany | 400/83 |
| 3403414 | 8/1985 | Fed. Rep. of Germany | 400/83 |
| 45530 | 4/1979 | Japan | 340/711 |
| 8041 | 1/1985 | Japan | 400/144.2 |
| 15179 | 1/1985 | Japan | 400/83 |
| 749239 | 5/1956 | United Kingdom | 312/7 TV |

OTHER PUBLICATIONS

Database Picoword 5100 Catalog produced by Brother. "Mini Shoin" Catalog produced by Sharp Co., Ltd.

Primary Examiner—David A. Wiecking
Attorney, Agent, or Firm—Oliff & Berridge

[57] ABSTRACT

A data processing apparatus provides excellent printing quality even though it employs an impact printer which is subject to mechanical vibrations during the typing operation. The apparatus comprises a highly rigid chassis frame for respectively supporting the printer and CRT in upper and lower portions of the frame and to withstand outside factors which adversely affect the printing quality. At the same time, inclination of the CRT is adjusted to provide the minimum size of the combined equipment and easy printing check within an area of an operator's eye sight. A shielding plate is also provided on the upper chassis to mount the printer and to prevent leaked magnetic flux from adversely affecting the CRT and printing quality.

11 Claims, 3 Drawing Sheets

DATA PROCESSING APPARATUS WITH CRT AND PRINTER

BACKGROUND OF THE INVENTION

1. Field of the Invention

This invention relates to a data processing apparatus in which a CRT (Cathode Ray Tube) and an impact printer are integrally and preferably arranged on a chassis.

2. Description of Prior Art

In a data processing apparatus, a CRT display and a thermal printer (non-impact printer) are mounted integrally on a chassis and covered by a cover plate. Within a limited space area, it is rather difficult to house these units as one unit compactly without adversely affecting printing quality. There are still some other apparatuses which divide the body case into several parts as compartments and encase these units respectively in compartments to allow highly efficient printing performance whereby printing is conducted without being adversely affected by external factors such as mechanical vibration during printing.

Concerning these kinds of data processing apparatuses, the CRT screen is vertically set and the thermal printer is set on the upper backside of CRT display. This type of data processing apparatus has not shows any failure in printing operation and quality but causes problems when the printer is replaced with a typewheel printer in machines equipped with the thermal printer and CRT display.

This trouble is attributable mainly to a fragile chassis construction which is not rigid enough to withstand the total working weight of printer while it is in printing operation, thus resulting in deteriorated printing quality. The images displayed on the CRT screen are also deflected and chattered. As long as this kind of conventional data processing apparatus is used, a small scale printer such as thermal printer, is not a problem even if it is arranged at the upper backside of a CRT display.

However, when a typewheel printer (as disclosed in U.S. Pat. No. 4,049,109) is employed, the typewheel having a plurality of characters on the outer periphery must be upright on a bottom side of a housing so that characters to be printed on a printing sheet on a platen can be seen. In order to strike the typewheel which is vertically arranged to the bottom of the housing, a ribbon cassette and a printing hammer must be vertically arranged against the typewheel.

Therefore, as shown in Japanese Utility Model Disclosure NO. 60-8041, the housing becomes taller than a diameter of the typewheel causing difficulty in stacking and transporting the data processing apparatus. In orer to reduce a height of the housing, a setting angle fixing the typewheel to the bottom side of the housing is contrived; however, a relative location of the printing hammer and the ribbon cassette must also be contrived.

Moreover, printed characters on the sheet cannot be seen behind the typewheel and the printing when set at such an angle. Also when the typewheel printer is provided with means for driving the typewheel and the printing hammer, it is much taller and longer than the thermal printer and extension of the total size of the data processing apparatus is limited. Accordingly, the problems associated with conventional data processing apparatus become very large scale when it is provided with typewheel printer at the upper rear part of CRT display as the images displayed on the CRT display are also swayed by the leakage from magnetic flux of the typewheel printer.

SUMMARY OF THE INVENTION

It is an object of this invention to provide a data processing apparatus mounted on a highly rigid chassis which protects printing quality from being deteriorated and images displayed on the CRT display from fluctuating due to leakage of magnetic flux from an impact printer (for example, typewheel printer). To achieve that object, an upper and a lower chassis of the chassis construction are framed with a shielding panel to mount a one unit printer. To fully withstand the external forces such as printing vibrations and to raise printing quality, highly rigid upper and lower frames are framed in combination with the shielding panel which simultaneously serve to prevent external foreign matters from intruding in to the CRT and to provide stability for the incorporated electronic circuit board.

It is another object of this invention to provide a data processing apparatus having a shortened total length and height in such a manner that the printed characters can be seen straightly and easily within an operator's scope of eyesight. By providing some inclination degree of the CRT setting, the apparatus can be constructed smaller and printed characters can easily be seen for inspection upon printing.

The data processing working area can also be reduced to a minimum. The CRT screen is inclined to some degrees for easy visual inspection of printed characters and printing quality.

In general, the foregoing and other objects will be carried out by providing a data processing apparatus comprising: a pair of lower chassis, each of said lower chassis being a vertical plate of an almost triangle shape having a lower flange, a front edge portion and a rearwardly and downwardly declined upper flange and being parallel with and apart from each other, said CRT being housed between said lower chassis; a pair of upper chassis, each of said upper chassis being a vertical plate mounted respectively through a flange formed at lower edge thereof on said each upper flange of said lower chassis; and a shield plate connected at each side thereof with at least one of said upper flange of said lower chassis and said flange of said upper chassis.

DETAILED DESCRIPTION

Figure 1:
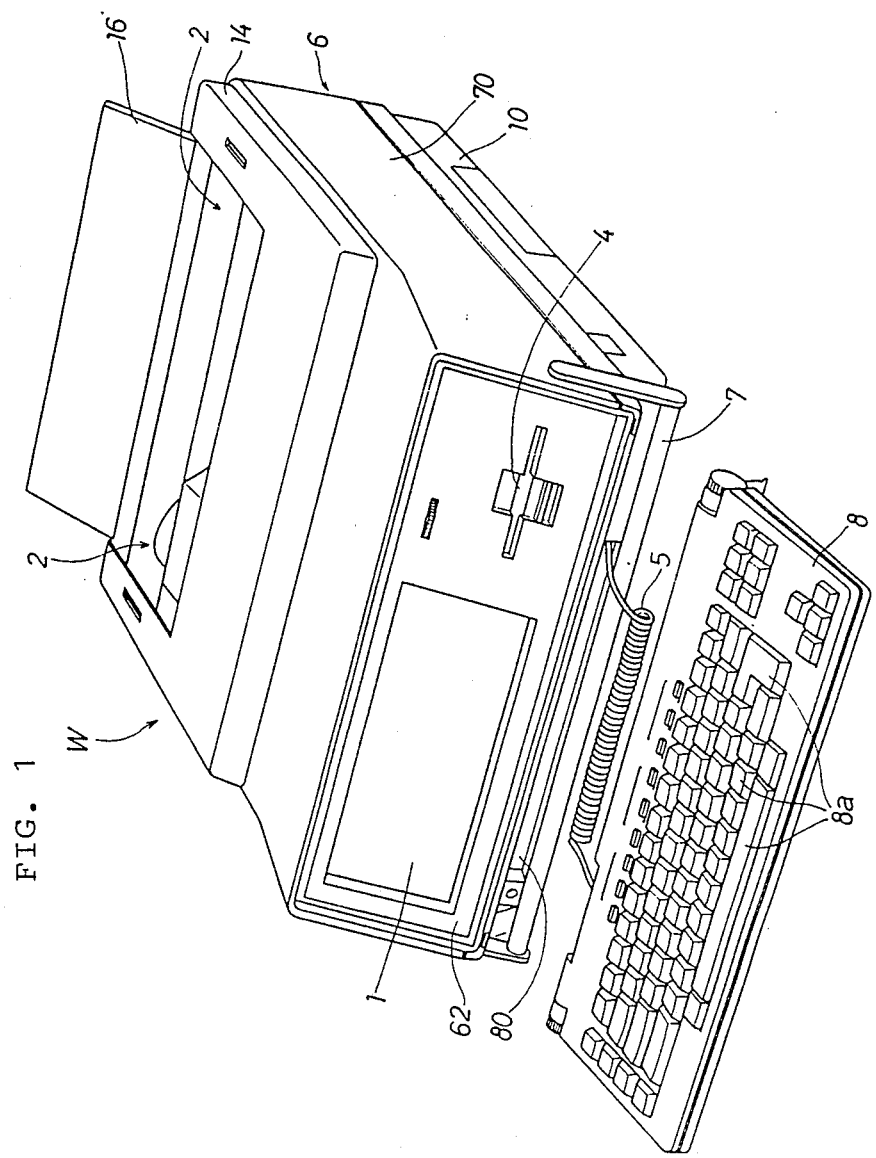
FIG. 1 is an overall view of a first embodiment of the present invention.
Figure 2:
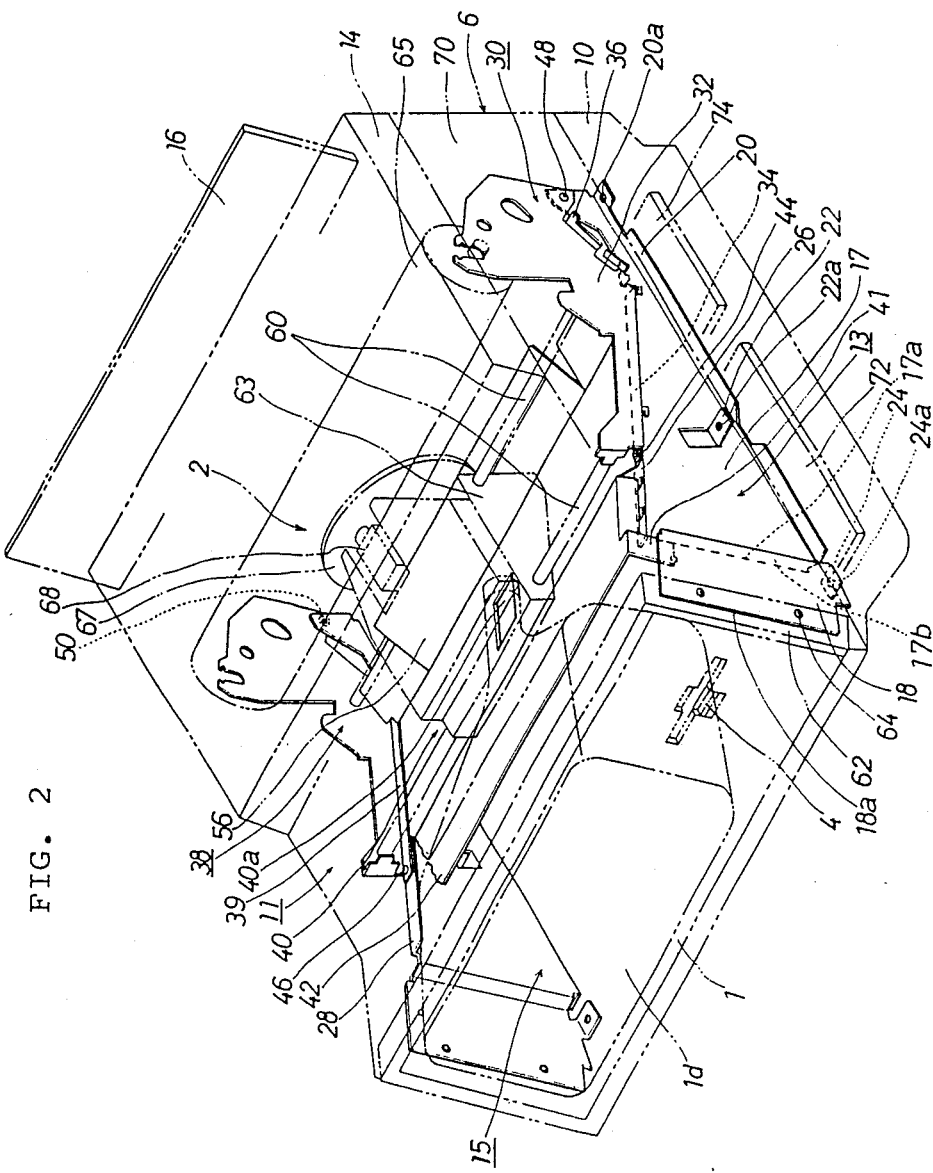
FIG. 2 is a detailed diagrammatic view of the first embodiment.
Figure 3:
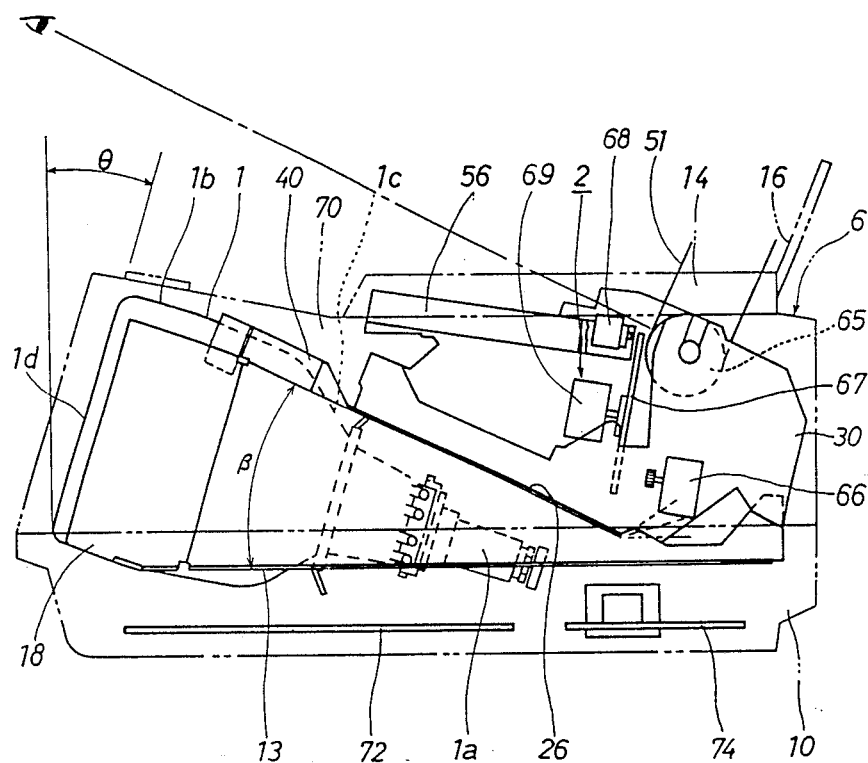
FIG. 3 is a side elevational view of the first embodiment of this invention.

The preferred embodiment of the present invention is explained in details with reference to drawings. Referring to FIG.1, there is shown a data processing apparatus W which includes a CRT screen 1d sized 5 inches and 9 inches, a typewheel printer 2 as impact printer, a floppy disk drive device 4, a carrying handle 7 movably mounted at the front side of apparatus body 6 and a separate keyboard 8. The keyboard 8 is provided with a plurality of keys 8a and is connected electrically with the apparatus body 6 via a curl cord 5. The curl cord 5 can be stored in the rectangular housing recess 80 provided on the lower front of apparatus body 6. The apparatus body 6 is provided with an under cover 10 as a bottom, an upper cover 70 mounted on the under cover 10, a top cover 14 mounted on the upper cover 70 and a paper support 16 on the upper rear part of the apparatus body 6.

CRT display 1, typewheel printer 2, floppy disk drive device 4, etc. are all housed and assembled in a chassis 11. The chassis 11 is formed of triangles constructed as a lower right chassis 13 and of a lower left chassis 15. The lower right chassis 13 extends vertically with respect to the bottom 10 and is provided with a side plate 17 having an upper end declining rear of the chassis and a front edge portion 17a inclining to the rear of the chassis, a front side plate 18 having a front edge 18a which slopes rearwardly parallel to a front edge of portion 17a and is connected to the front edge portion 17a of the side plate 17 through an outwardly deflected flange 17b attached to front edge portion 17a of side plate 17, a lower flange 20 being bent in L form externally from the lower end of side plate 17, a projecting part 22 formed on the side plate 17 being partially bent externally normal to the side plate 17 from the lower intermediate of said side plate 17, a leg plate 24 being bent internally normal to said front side plate 18 from a lower end thereof, and an upper flange 26 forming an inclined surface and being bent internally at and normal to upper end of the side plate 17.

The center of projecting part 22 and leg plate 24 is provided straight holes 22a and 24a respectively, and rear lower flange 20 is provided with a straight hole 20a. A lower left chassis 15 is arranged in parallel with the lower right chassis 13 and provided with an upper flange 28 having the same inclination with that of the upper flange 26 of the lower right chassis 13 and is symmetrically formed with said lower right chassis 13.

Moreover, on the upper flange 26 of lower right chassis 13 is placed an upper right chassis 30 which is provided with a side plate 32 arranged in parallel with the side plate 17 of the lower right chassis 13. The side plate 32 is provided with a flange 34 bent internally in L form at its lower end and an engaging part 36 formed on and normal to the side plate 32. An upper left chassis 38 symmetrically configured with the upper right chassis 30 and oppositely disposed thereagainst is mounted on the lower left chassis 15.

Further, a silicon steel shielding plate 40, which is used to separate the CRT display 1 from the typewheel printer 2, is inserted, while touching upon both side plates 41, at its both sides between the upper flange 26 of the lower right chassis 13 and the flange 34 of the upper right chassis 30 and between the upper flange 28 of the lower left chassis 15 and the flange 39 of the upper left chassis 38 and fixed to the flanges by screws 44 and 46.

On this shielding plate 40 is formed a convex part 42 corresponding to the configuration of CRT display 1. Upper rear end of the lower right chassis 13 and lower rear end of the upper right chassis 30 are connected together by a screw 48. Upper rear end of the lower left chassis 15 and lower rear end of the upper left chassis 38 are fixed by a screw 50. The shielding plate 40 can be fixed to the upper flange 26 of the lower right chassis 13 or to the flange 34 of the upper right chassis 30.

The chassis 11 thus formed is fixed at its bottom to under cover 10 covering a bottom of the chassis 11 by screws (not shown) through holes 20a, 22a, 24a. The lower left chassis 15 is fixed in the same manner to the under cover 10 by screws (not shown). A rectangular front panel 62 is sloped rearwardly and fixed by two screws 64 to the front side panel 18.

On the lower chassis 13 is the CRT display 1 mounted with its screen 1d leaned backward $\theta$ degrees and on the lower chassis 13 is formed the sloping upper flange 26 having an inclination of $\beta$ degrees in a position over an electronic gun 1a and lower than the top 1b of CRT display 1.

Further, on the front side of the lower chassis 13 is fixed the front side panel 18. The front side panel 18, enables the front panel 62 to be fixed with high rigidity thus allowing the CRT display 1 and the floppy disk drive device 4 to be mounted as one unit thereon. The leaning angle ($\theta$ degrees) of the CRT screen 1d is preferably lies with the range of 10 to 30 degrees, and is approximately 18 degrees in this the embodiment.

The upper right chassis 30 is mounted on the under cover 10 through a vibration-proof rubber (not shown) inserted into the engaging part 36 and the upper left chassis 38 is also mounted in the same manner on the under cover 10. Further, the typewheel printer 2 is supported by the upper right chassis 30 and the upper left chassis 38 over the upper flange 26 and is positioned behind the neck portion 1c at the intermediate position of the CRT display 1.

This typewheel printer 2 consists of a platen 65 rotatably supported between upper left and right chassis 30, 38, a pair of guide bars 60 fixed to the upper chassis 30, 38 in parallel with the platen 65, a well-known line feed motor (not shown) for feeding printing sheet 51 by rotating the platen 65, a carriage 63 slidably supported by the pair of guide bars 60, a well-known carriage shifting mechanism including a carriage motor 66 for reciprocating the carriage 63 along the platen 65, a typewheel 67 rotatably driven by a character selector motor 69, a solenoid hammer assembly 68 having a printing hammer to strike the reverse side of typewheel 67, a ribbon cassette 56 housing a printing ribbon therein, a well-known ribbon feed motor (not shown) for winding up its printing ribbon, and a deleting mechanism including a well-known deleting ribbon (not shown). Moreover, the typewheel 67, the character selector motor 69, the solenoid hammer assembly 68, the ribbon cassette 56, the ribbon feed motor, the deleting mechanism are mounted on the carriage 63.

Over the upper part of typewheel printer 2 is provided the upper cover 70 covering the overall of the chassis 11. Moreover, there are arranged inside the upper cover 10 and on the lower part of the CRT display 1, a control PCB (Printed Circuit Board) 72 and a power supply PCB 74 to control the typewheel printer 2 and the floppy disk drive device 4 based on the entered signals from the keyboard 8.

The data processing apparatus thus constructed in this embodiment is provided with the lower flange 20 and the upper flange 26 which are respectively formed by bending the lower and upper edges of lower right chassis 13. The upper flange 26 is sloped backward thus allowing the lower flange 20 and the upper flange 26 to be angularly interconnected with each other for highly rigid chassis construction. This leaning angle ($\beta$ degrees) of the upper flanges 26 is preferably 10 to 30 degrees, and is approximately 24 degrees as shown in the figures.

Under a leaning angle of 10 degrees, the chassis body becomes taller. With a leaning angle of 30 degrees, the typewheel printer 2 is leaned too far causing deteriorated printing quality. The shielding plate 40 arranged over the lower right chassis 13 and the lower left chassis 15 contributes to protecting any leaked electromagnetic flux from leaking under the shielding plate 40 which is generated from the character selector motor 69, the carriage drive motor 66, the line feed motor, the ribbon feed motor and the solenoid hammer assembly 68 etc.. Thus, a high fidelity CRT display 1 can be realized.

Further, this shielding plate 40 serves to protect foreign matters such as paper clips from falling accidentally through typewheel onto the control PCB 72 and the power supply PCB 74 housed inside the under cover 10. This kind of accidents are liable to occur in situations when the top cover 14 covering the typewheel printer 2 is open in order to replace the typewheel 67 or the ribbon cassette 56 with a new one. Shielding plate 40 also can protect, the operator from mistakenly putting his hands into the high voltage zone (1a) of CRT display 1.

Moreover, there is provided approximately on the center of the shielding plate 40 a hole 40a through which it is possible to harness the control PCB 72, the power supply PCB 74, etc. to provide added stability. After this harness treatment, the hole 40a is covered with the flat cable clamp (not shown), thus preventing leakage of magnetic flux generated from the motors, etc. down under the shielding plate 40.

Next, the printing operation of data processing apparatus thus constructed is explained.

In operation, first, printing data are keyed in from the character keys 8a on the keyboard 8 and characters corresponding to keyed-in data are then displayed on the CRT screen 1d. Upon completion of inputting documentation, documentation data stored in memory are printed by pressing the printing-start key. The typewheel 67 is rotated by the character selector motor depending on said documentation data and characters corresponding to said data are arrayed in printing positions.

Successively, the character on the typewheel 67 is struck by the printing hammer through the printing ribbon to print the character on the printing sheet 51 rolled on the platen 65. Next, the carriage 63 is moved by a space of one character to the right along the platen 65 ready for printing the next character depending on said documentation data. The printing is executed in this manner repeatedly.

When the characters per line are completely printed, the platen 65 is rotated depending on data designating change of line so that the printing sheet 51 is trasnferred one line and the carriage 63 is moved to the left and returned to an original position. In this manner, the printing operation continues depending on documentation data. At this time, characters just printed on the printing sheet 51 can be seen directly from the operator's side and the printing can also be stopped immediately upon discovery of printing errors.

Further, when using this data processing apparatus in direct mode of operation (used as a typewriter) in which printing is executed simultaneously with typing, the entered data can be checked for printing errors directly on the printing sheet 51. Using this mode of operation, printing errors can be deleted by the aforesaid deleting mechanism and correct characters can be typed out again immediately. The effective typing operation can be realized in this fashion.

According to this embodiment, the CRT screen 1d is inclined approximately 18 degrees. The inclination angle $\theta$ is determined to the best value within the range of 10 to 30 degrees so that the CRT display 1 can be easily seen for checking for data entry. The smaller the inclination, the longer the body 6, resulting in unnecessary increased space and an apparatus bigger in scale as a whole.

On the other hand, the greater the inclination, the taller the body 6. Consequently, the printing portion must be disposed higher so that printed characters can be checked directly upon typing. For this reason, the vibration of the apparatus becomes large and the carriage 63 cannot be moved smoothly, resulting in deteriorated printing quality.

Further, in this embodiment, the inclined angle ($\beta$ degrees) of the upper flange 26 is larger than that of CRT display 1 or may be equal to the inclination angle ($\theta$p9 degrees) of CRT display 1. The data processing apparatus as herein described defines a large space on the upper part of electronic tube 1a of CRT display 1 by inclining the CRT screen 1d backward. This space houses the typewheel printer 2 so that the bottom of upper chassis 30 supporting the typewheel printer 2 is located lower than the top 1b of CRT display 1.

Accordingly, the length and height of body 6 are smaller as compared to the conventional apparatus using the typewheel printer 2 as an impact printer merely replaced by thermal printer (non-impact printer). The CRT screen 1d is of good visibility without image fluctuation in a favorable operating position.

This concludes explanation on the preferred embodiment of the present invention. However, the scope of the present invention is not necessarily be confined to only the preferred embodiments as so far been discussed. The present invention can further be embodied with no limitations to any other preferred applications without deviating from the spirit and scope of the present invention.

This invention can be embodied further,for example, in that the printer uses a well-known dot-matrix printer in place of impact printer, and the dot-matrix printer functions to print characters by driving respectively a plurality of printing wires with solenoid.

What is claimed is:

1. A data processing apparatus including a keyboard having a plurality of keys, a CRT display with an electron gun for displaying, on a picture plane, characters corresponding to keys operated on said keyboard, and an impact printer for printing data inputted from said keyboard on printing paper, said data processing apparatus characterized in that said apparatus has a body having upper, bottom, front and rear surfaces which is divided into a first portion including said front and bottom surfaces, and a second portion including said upper and rear surfaces, where said first portion includes said CRT display, the picture plane of which occupies most of said front surface of said first portion with the top of said picture plane slanting rearwardly, said second portion includes said impact printer which is placed over the electron gun of said CRT display, and a shield plate is disposed between said first and second portions for shielding a magnetic flux generating from said impact printer.

2. A data processing apparatus according to claim 1, wherein said second portion has upper left and right chassis and said impact printer comprises a typewheel printer including a platen rotatably supported between said upper chassis, a carriage slidably supported by a pair of guide bars attached to said upper chassis, a carriage motor for moving the carriage along the platen, a typewheel rotatably driven by a character selector motor, and a solenoid hammer assembly having a printing hammer to strike the reverse side of said typewheel.

3. A data processing apparatus according to claim 1, wherein said rearwardly slant of said picture plane is at an angle between 10 and 30 degrees from a vertical line to said bottom surface.

4. In a data processing apparatus including at least a CRT and an impact printer, an improvement comprising:
- a pair of lower chassis, each of said lower chassis being a vertical plate of substantially triangular shape having a lower flange, a front edge portion and an upper flange sloping downwardly to the rear of said lower chassis, and being parallel with and apart from each other, said CRT being housed between said pair of lower chassis;
- a pair of upper chassis, each of said upper chassis being a vertical plate having a lower flange, each said upper chassis being mounted through said upper chassis lower flange on said upper flange of the corresponding lower chassis, said impact printer being housed between said pair of upper chassis; and
- a shield plate inserted at each side thereof between said upper flange of said lower chassis and said lower flange of said upper chassis.

5. A data processing apparatus according to claim 4, wherein said impact printer comprises a typewheel printer which consists of a platen rotatably supported between said upper chassis, a carriage slidably supported by a pair of guide bars attached to said upper chassis, a carriage motor for moving the carriage along the platen, a typewheel rotatably driven by a character selector motor and a solenoid hammer assembly having a printing hammer to strike the reverse side of said typewheel.

6. A data processing apparatus according to claim 4, where said front edge portion of each lower chassis slopes upwardly to the rear of said lower chassis and is connected through an outwardly deflected flange with a front side plate having a front edge sloping rearwardly parallel to said front edge portion.

7. A data processing apparatus according to claim 6, wherein each of said front side plates has a means at front edge portion thereof for mounting a front panel on which said CRT and a floppy disk driving device are installed.

8. A data processing apparatus according to claim 7, wherein said means for mounting said front panel are mounting holes.

9. A data processing apparatus according to claim 7, wherein said front panel slopes rearwardly in a range of 10 to 30 against vertical line.

10. A data processing apparatus according to claim 4, wherein an undercover is attached to a lower portion of each of said lower chassis.

11. A data processing apparatus according to claim 4, where said upper flange of said lower chassis has an angle of 10 to 30 degrees against the longitudinal direction of said lower flange of said lower chassis.

* * * * *